United States Patent Office 2,948,490
Patented Aug. 9, 1960

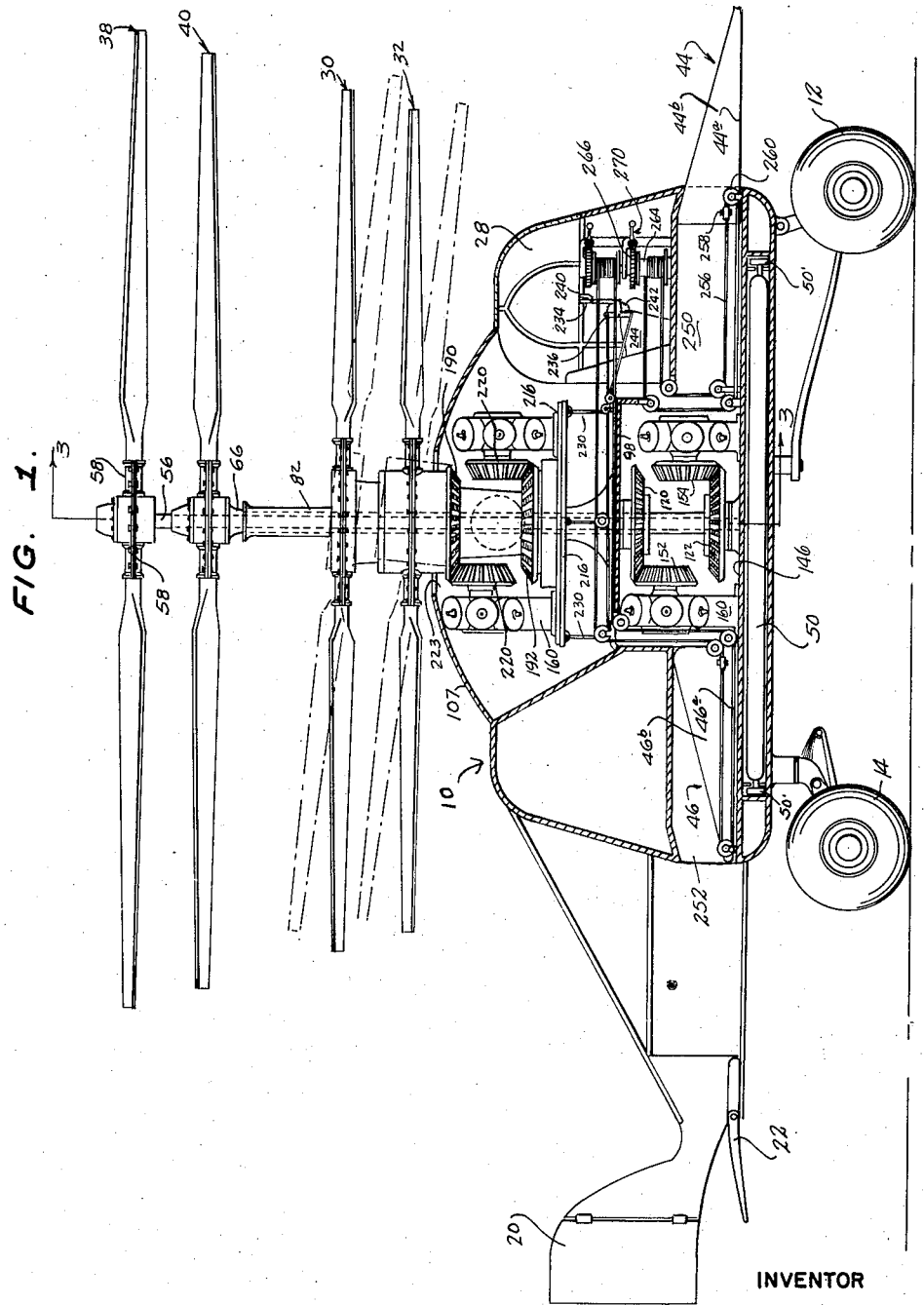

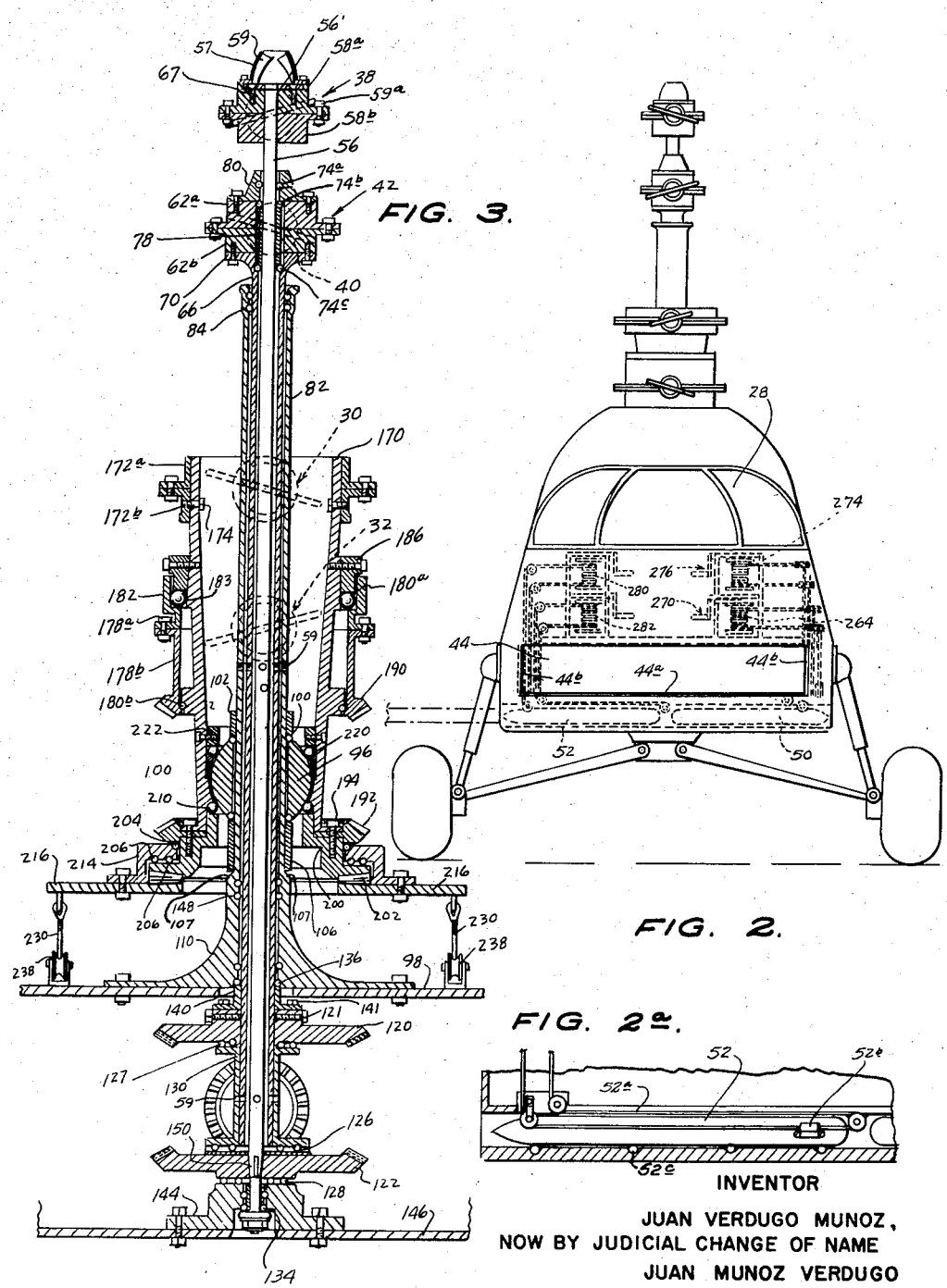

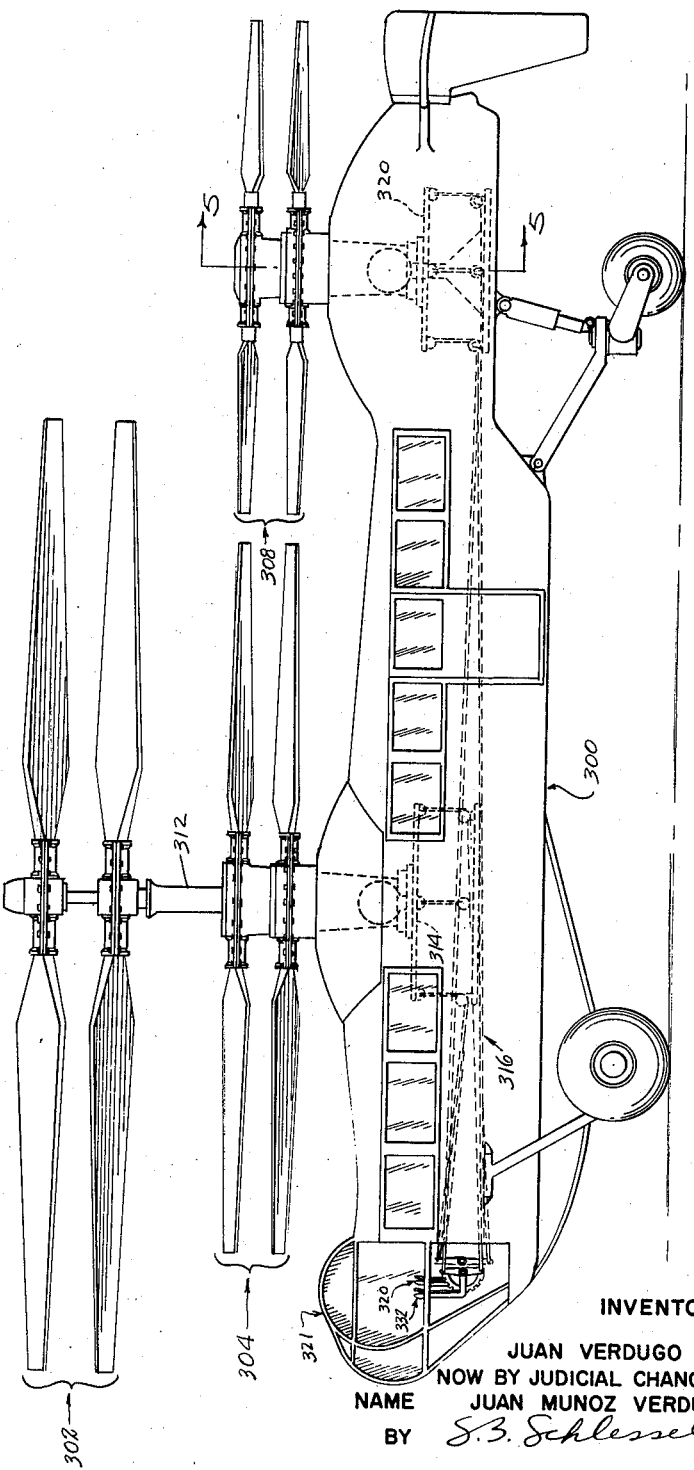

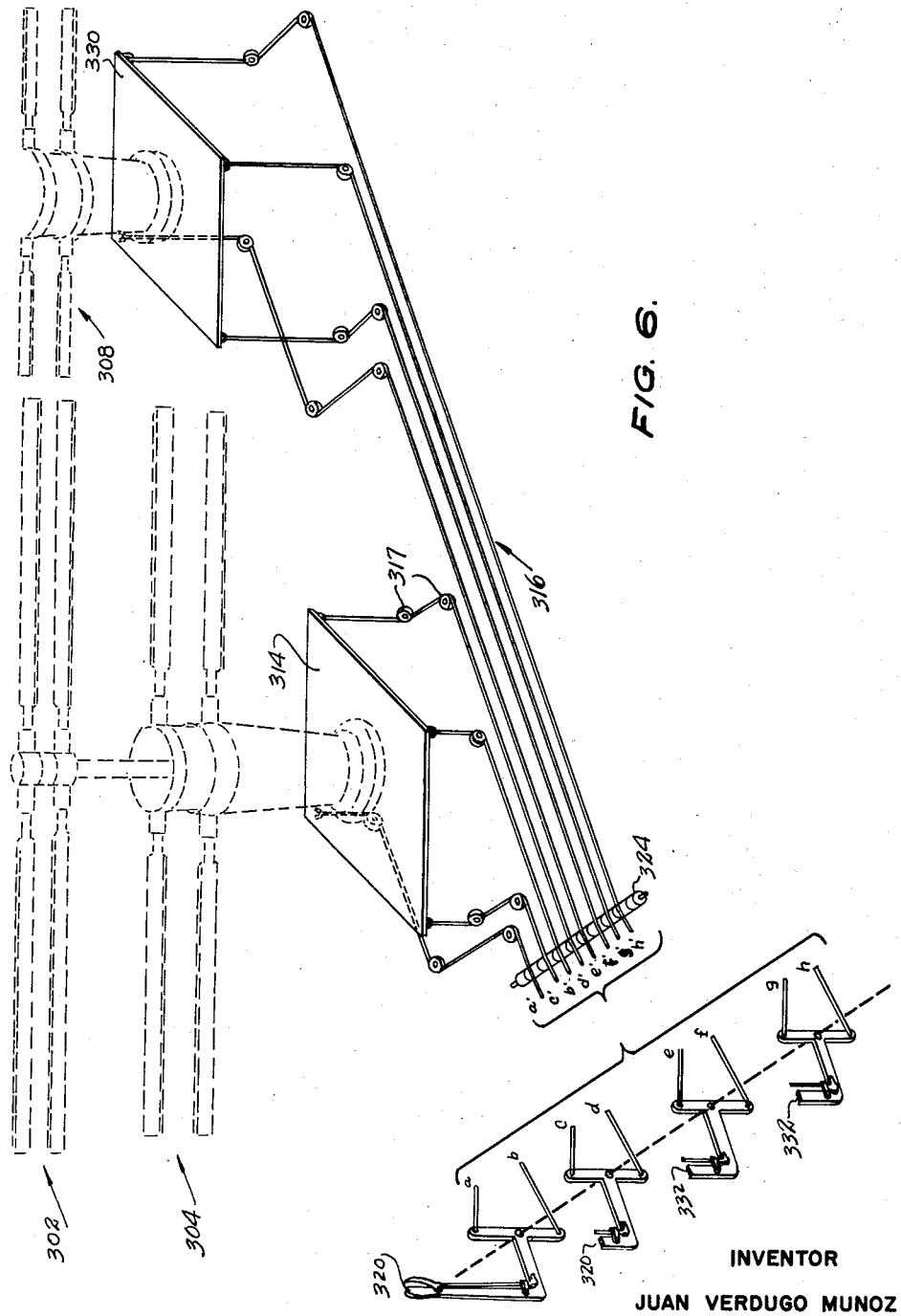

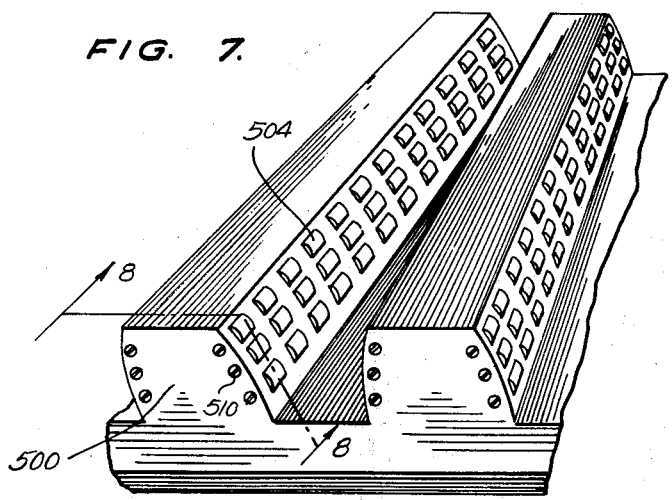
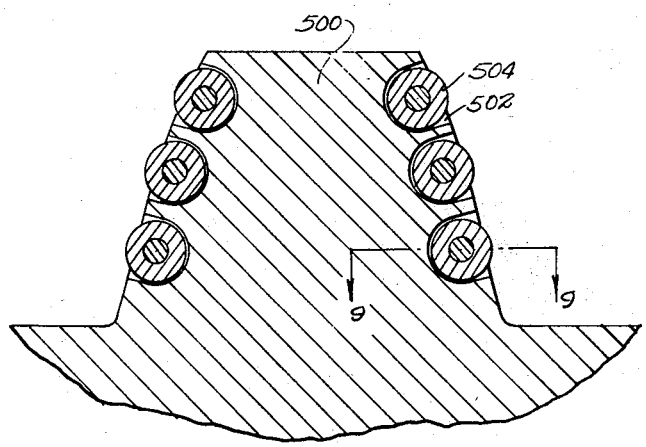
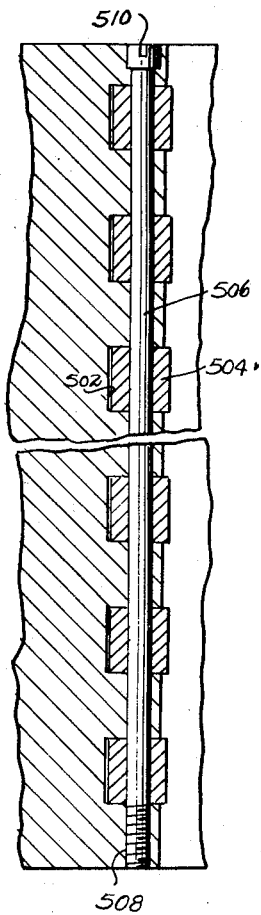

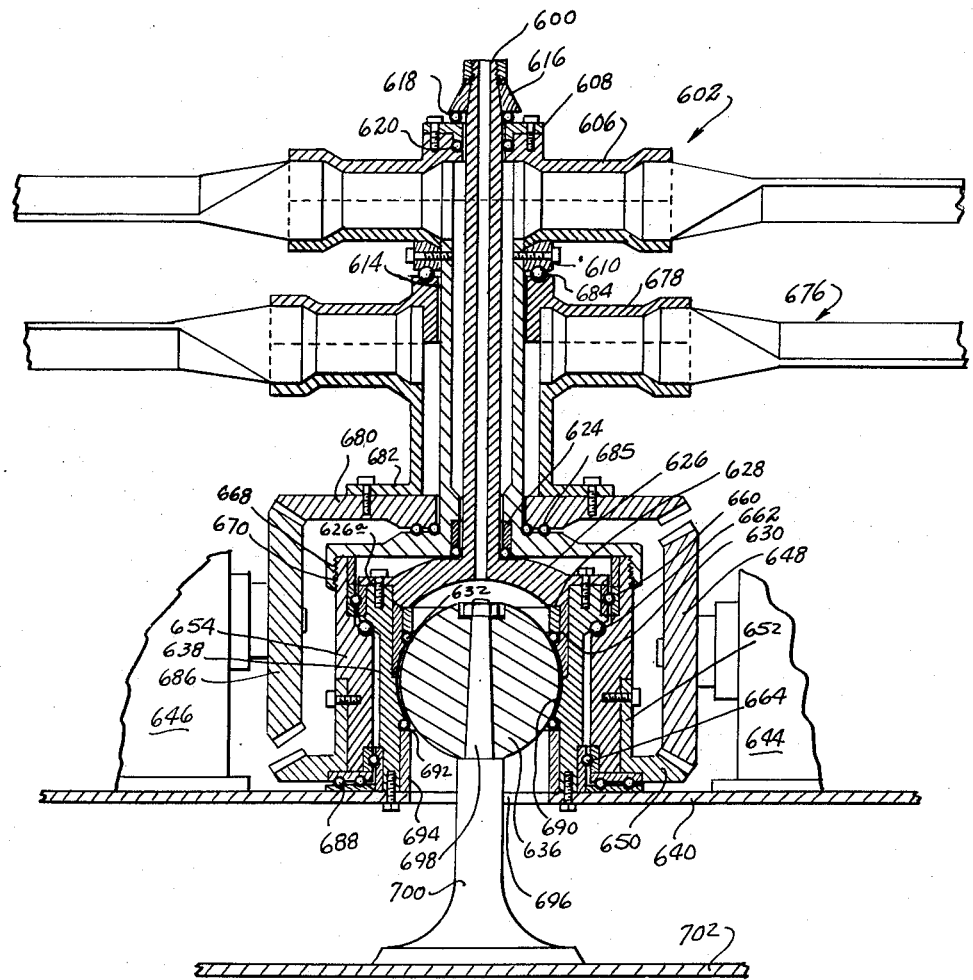

2,948,490

HELICOPTER

Juan Verdugo Munoz, 2671 Bainbridge Ave., Bronx, N.Y.; now by judicial change of name Juan Munoz Verdugo Filed Aug. 11, 1953, Ser. No. 373,523

16 Claims. (Cl. 244—17.19)

This invention relates to helicopters and more particularly to helicopters having rotors which are tiltable with respect to a fuselage in order to afford a high degree of directional control.

It is an object of the present invention to provide a simple and economically constructed, easily operable and relatively safe helicopter having counter rotating propellers which are tiltable relative to a fuselage so as to vary the plane of rotation.

Another object of the present invention is to provide an easily controlled helicopter which can rise rapidly in a vertical or inclined manner from the ground or which can readily and safely be operated, utilizing one or more pairs of tiltable propellers.

Another object of the present invention is to provide a helicopter of such construction that it utilizes the downwash from the propeller against adjustable surfaces of the helicopter so as to facilitate maneuverability.

Still another object of the present invention is to provide a helicopter having a plurality of pairs of superimposed parallel propellers, one pair of which is tiltable to permit banking, ascent or descent of the helicopter.

Another object of the present invention is to provide two or more sets of concentric shafts, each provided with a plurality of pairs of superimposed parallel propellers, one pair of which is tiltable with respect to the vertical axis, so as to make possible the construction of helicopters of greater size and power.

A further object of the present invention is the provision of roller bearings installed in the teeth of the gears so as to prevent frictional losses, facilitate the operation of the shafts rotating the propellers, and provide a means of reducing the frictional heat engendered by operation.

This application is a continuation-in-part of my copending application S.N. 212,872 filed February 27, 1951, which was in turn a continuation in part of my application S.N. 169,709, filed June 22, 1950.

In brief, my invention provides a construction for highly maneuverable, large sized helicopters using counter-rotating propellers in sets, and wherein certain propellers, or sets, are tiltable with respect to the fuselage so as to provide thrust in any desired direction within design limits. Further, I provide certain retractable surfaces disposed so as to receive the force of the downwash from the propellers in such a manner that a controllable degree of the area thereof may be exposed to propeller downwash for determining the angle of rise or descent. Thus, the lateral control surfaces and the fore and aft control surfaces taken in conjunction with the universal tiltability of the rotational planes of the propeller or propellers will affect rapid maneuverability and definite directional control, a highly desirable aspect of military aircraft.

A detailed description of the invention will now be given in conjunction with the appended drawing, in which:

Fig. 1 is an elevation partially in section of one form of craft embodying my invention.

Fig. 2 is an elevation of the forward end of the craft.

Fig. 2a is a fragmentary view of the pulley and roller system for a lateral control element.

Fig. 3 is a section through 3—3 of Fig. 1.

Fig. 4 is an elevation of another craft utilizing my invention.

Fig. 6 is a schematic perspective of one form of control system for the propellers of the form of the invention shown in Fig. 4.

Fig. 7 is a fragmentary perspective of a portion of one of the gears used to drive the propellers.

Fig. 8 is a section through 8—8 of Fig. 7.

Fig. 9 is a section through 9—9 of Fig. 8, and

Fig. 10 is a section through a modified portion of the craft shown in Fig. 4.

Figure 5:
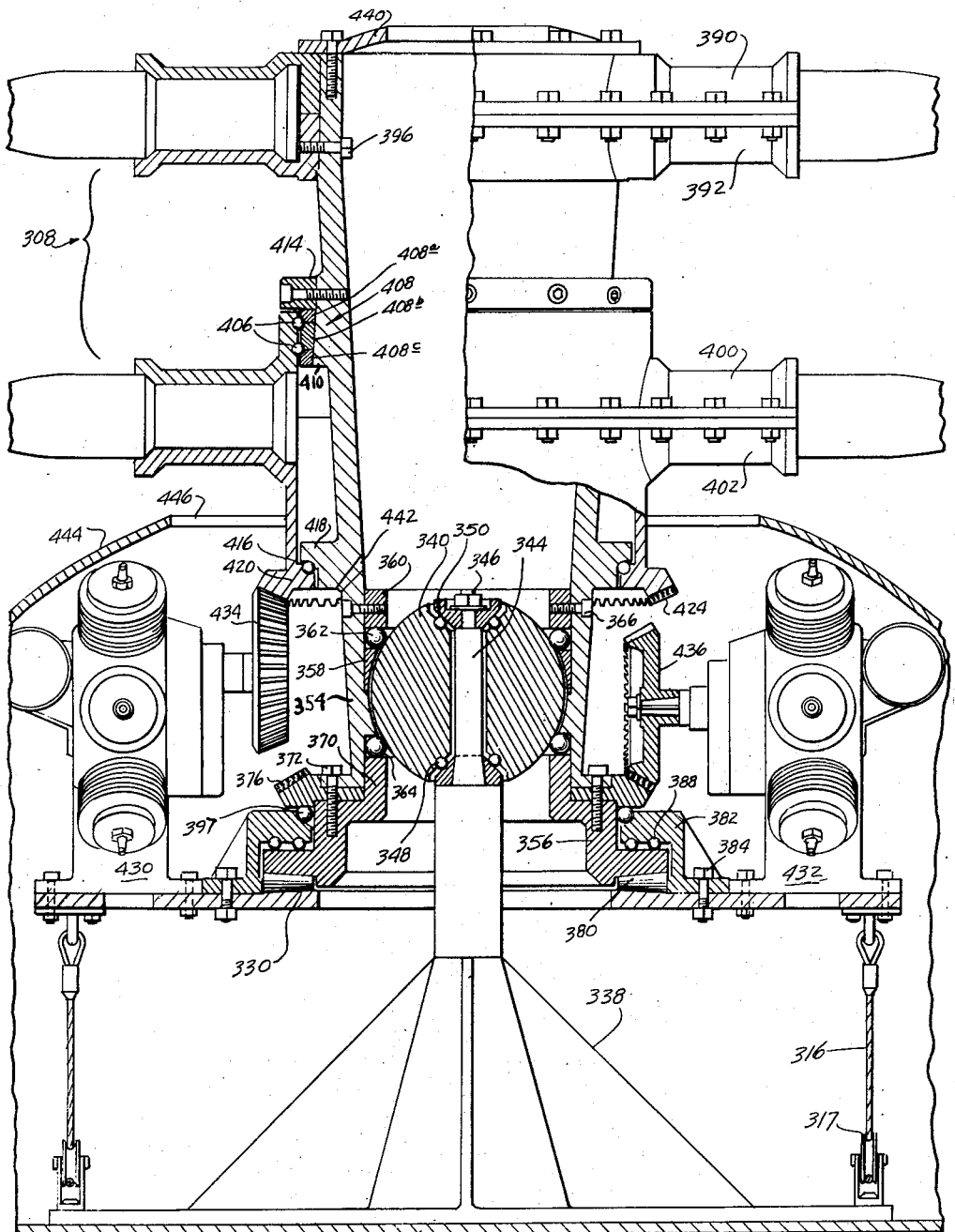
Fig. 5 is a section through 5—5 of Fig. 4.

With respect to Figs. 1, 2, and 3, the craft illustrated comprises a fuselage 10 having forward wheels 12 and castered rear wheels 14 of any suitable construction, no details being given herein since the carriage structure does not form part of the present invention. The rear of the fuselage is provided with a rudder 20, and, if desired, may also be provided with the usual elevators 22. The rudder and elevators may be assumed to be controllable from the forward cabin 28 in the conventional manner.

The particular features of my invention reside in the provision of tiltable propellers 30 and 32 mounted in a manner to be hereinafter described. The invention further resides in the combination of such tiltable propellers with non-tiltable propellers 38 and 40 and invention further resides in combining with either set of propellers or both sets of propellers certain fore and aft retractable surfaces or air foil elements such as 44 and 46 respectively. There is further provided retractable laterally disposed air foil surfaces 50 and 52.

The main features of the craft having been described as above, attention is now invited to the structural arrangement for mounting the propellers as shown in Fig. 3. The topmost propeller 38 is secured to a shaft 56 by a split and flanged coupling having upper and lower sections 58a and 58b extending laterally on both sides of the shaft and bolted together as at 59a over the cylindrical inner ends of the individual propeller blades. In the same manner the propeller 40 is secured as by flanged coupling sections 62a and 62b to a shaft 66 which surrounds shaft 56. The mode of securing the couplings to their respective shafts are similar in that shaft 56 is surmounted by an integral flange 56' to which the upper coupling 58a is bolted as at 67 while shaft 66 is surmounted by an integral flange 70 to which the lower coupling 62b is bolted as shown. Intermediate the two shafts are provided various ball bearing means as indicated at 74a, b and c as required from the standpoint of design, there being a spacing collar 78 between the bearings 74b and 74c. It will be understood that suitable internal shoulders are provided for bearing races within shaft 66 and in the upper coupling 62a, as shown. A collar 80 may be bolted to upper coupling 62 having an internal shoulder or internal groove to hold the uppermost bearing means 74a. It will be understood that this phase of my invention is entirely a matter of engineering design and the particular bearing construction is not essential to the inventive concept. In fact, it will be recognized that shafts 56 and 66 may have relative rotation without any special bearing elements therebetween. Surrounding the hollow shaft 66 is an additional hollow shaft 82 with a suitable bearing means such as 84 intermediate the two shafts. The shaft 82 is a rigidifying shaft and it passes downwardly through a sphere 96, being fastened securely to a relatively immovable plate 98 which may be considered part of the plane fuselage. Thus the two shafts 56 and 66 likewise pass downwardly through sphere 96 and are provided with means to cause rotation thereof in opposite directions as hereinafter described, it being understood that rigidifying shaft 82 is relatively stationary.

The sphere 96 is fixed on the shaft 82, although it is permitted to be rotative with respect to means of bearing means 100 retained as by collars such as the upper collar 102 and the lower collar 106. The lower collar may rest on a shoulder 107 of a base 110 provided at the lower end of shaft 82, while upper collar 102 may be secured to the shaft in any suitable, though removable manner, such as by screws, not shown.

Thus it will be apparent from the foregoing description that a construction is provided wherein two pairs of propellers 38 and 40 in axial alignment are supported for rotation by concentric rotary shafts surrounded by a third shaft which is relatively stationary but which serves to minimize vibration in the rotating shaft and propeller system and wherein a sphere is rotatively mounted on the rigidifying shaft. The sphere may be solid or hollow, as a matter of design and weight requisites, and it forms a universal joint in conjunction with certain other elements for the purpose of providing tiltability of the lower propellers 30 and 32 as will be later described.

With reference to Fig. 1, the power means for driving the propellers 38 and 40 comprises a gear 120 bolted as at 121 to the shaft 66 and another gear 122 keyed to shaft 56. Suitable thrust bearing devices as indicated at 126 and 128 are provided on both sides of gear 122. A bearing device 127 acting through vertical collar 130, flanged at both ends serves to support the weight of gear 120 and shaft 66 while the bearing 128 serves to support the weight of gear 122 and shaft 56, along with the weights of their respective propellers at such times as the propellers are not provided lift. When however, the propellers are providing lift, the upward pull of shaft 56 acting through bearing 126 and collar 130 is exerted against a bearing device 134, while the upward pull of shaft 66 is exerted against a bearing device 136 through a collar 140 which is rotative with gear 120 being bolted thereto at 141.

The bearing 134 exerts its thrust against an end plate 144 firmly fastened to the bottom of the fuselage 146, as shown in Fig. 3. Various roller bearings such as 148 may be provided intermediate shaft 66 and base 110 as indicated.

It will thus be apparent from the foregoing description that the concentric shafts 66 and 56 are provided with suitable bearings and gears such that they may be rotated with a minimum of friction with respect to each other and with respect to the fuselage and that suitable bearings are provided to take the thrust of the shafts in axial directions either upwardly or downwardly. It will be understood that the sleeve 130 is securely fastened as to the shaft 66 to take downward thrust while the collar 140 is disposed to transmit upward thrust of this shaft to bearing 136. It will also be appreciated that the lower portion of shaft 56 is tapered as at 150 so as to exert a thrust downwardly within its socket in gear 122 which in turn bears on the thrust bearing 128.

Referring to Fig. 1, the gears 120 and 122 are driven, respectively, by pinions 152 and 154 powered by conventional air craft motors, such as 160, preferably of compact design, such as the Wright Whirlwind, and suitably provided with pedestals or bases of different height, as shown, which can be secured to the fuselage floor 146 in any suitable manner. The particular construction of the motors is not essential to the concept of my invention and presumably various types of light and powerful internal combustion engines may be adapted for mounting within the fuselage of my aircraft for my particular purposes. The disclosures of the motors is symbolic only and my inventive combination is in no way limited to the rotary type schematically shown, nor to internal combustion engines for that matter. Likewise nonessential details such as the controls for the motors, fuel tanks, etc., are omitted since they form no part of the present inventive concept.

Preferably the shaft 56 is made hollow so that cooling air may pass downwardly from a capping collar 57 which air may be utilized to cool the several motors by virtue of providing perforations as shown in Fig. 3 through the various shafts 56, 66, and 82, as well as collar 130. The perforations are generally designated by the reference character 59 and it will be understood that as many perforations as are required for proper cooling may be provided. If desired, the interior of the capping piece 57 may have pump vanes 59' therein so as to force air either inwardly or outwardly through the shaft 56, depending upon design conditions.

Upon consideration of Fig. 1, it will be apparent that the motor and gear arrangement provides for independent rotation of the propellers 38 and 40 and it will, of course, be understood that such rotation is in opposite directions in accordance with well-known principles.

Attention is now invited to propellers 30 and 32 and it will be seen that such propellers are mounted between suitable flanged and split couplings which are bolted together so as to secure the propellers to a hollow sleeve or hub 170. Thus, the upper coupling halves 172a and b clamp to the exterior of sleeve 170 by means of bolts 174 engaging 172b while the split coupling sections 178a and b are bolted together as shown and supported on sleeve 170 by means of bearing devices 180a and b. In order to provide for assembly, the bearings 180a are carried in a collar member 182 which is formed of coupling section 178a. The bearing elements bear against a tapered position 183 of the outer surface of sleeve 170. A retaining ring 186 is secured above the collar 182 to prevent upward displacement, the retaining ring 186 being bolted or otherwise removably secured to sleeve 170.

Thus, it will be apparent that the propeller 30 is rotative with sleeve 170 while the propeller 32 is rotative relative to sleeve 170. A bevel gear 190 is formed at the base of coupling section 178b to provide rotation, in a manner to be hereinafter described, for propeller 32 while a bevel gear 192 is secured to the base of sleeve 170 to provide for rotation of the sleeve. The gear 192 may be secured as shown by means of bolts 194 wherein the gear is sandwiched between a flange at the base of sleeve 170 and a collar 200. The collar 200 serves as a raceway for a conical thrust bearing device 202 as well as for ball bearing means 204 and 206. Further, the collar is shaped to protrude within sleeve 170 so as to form a support for a ball bearing device 210 which facilitates rotation of the collar around the sphere 96. Retention of collar 200 is provided by means of a surrounding collar 214 which forms a lower support for bearings 206 and which is bolted to a plate 216.

Within sleeve 170 is an additional ball bearing device 220 on the upper surface of sphere 96 retained in place by a retainer ring 222 bolted within the sleeve. Thus the sleeve 170 is supported on sphere 96 and is universally tiltable therearound to any degree desired to the extent of the design and relative dimensions of the parts.

Accordingly, it will be appreciated that the entire system comprising sleeve 170 and propellers 30 and 32 may be tilted as force is applied to provide tilting of plate 216 in a manner hereinafter described. It will be apparent that the top of the fuselage is provided with a suitably large opening 223 as shown to prevent interference with sleeve 170 at any angle of tilt.

In order to provide rotational power for propellers 30 and 32, the same motive scheme is utilized as was heretofore described in connection with propellers 38 and 40. Mounted on plate 216 are motors such as 160 which turn respective pinions 220 or rotating gears 190 and 192 in an obvious manner. Accordingly, it will be understood that as plate 216 is tilted about ball 96, the entire motor system, transmission, and propellers will tilt as a unit. The motors for the tilting propellers are ventilated through the opening 223.

From the description thus far given, it will be apparent that the propellers 38 and 40 are non-tiltable with respect to the fuselage; the motors thereof being firmly fastened to the floor of the fuselage while the system which comprises the propellers 30 and 32, the transmission and the motors therefor, is suspended on a sphere which though non-tiltable per se permits tilting of the latter propeller system.

In order to provide for tilting of the plate 216, a simple pulley and cable system is disclosed. Thus, each corner of the plate has a cable such as 230 secured thereto. By comparing Figs. 1 and 3 it will be apparent that the cables are secured with one pair for controlling tilting about a longitudinal axis and another pair for controlling tilting about a transverse axis. Thus, in Fig. 1, the cables 230 control tilting about a transverse axis while in Fig. 3 the cables 230 control tilting about a longitudinal axis. Obviously, plate 216 may be circular or square. If square, it may be disposed with a diagonal in the fore-aft direction.

Each cable pair is manipulated by a lever 234 in the cockpit. Any suitable arrangement such as a pivot bar 236 rocked by lever 234 may be utilized, the ends of each cable of a cable pair being secured to a respective end of the lever bar. Suitable pulleys such as 238 are provided depending upon the particular layout of the interior of the craft, to properly conduct the several cables to their respective control handles. The pulleys may be fastened directly to the fuselage plate 98 and to such other structural elements in the interior of the craft as may be necessary to provide a continuous path from the point of juncture of individual cables with plate 216 to the appropriate rocker bar 236.

While only one handle 234 has been illustrated in Fig. 1, it will be apparent that in the present instance two such handles will be required; the handle disclosed will provide tilting of propellers 30 and 32 about a transverse axis while another identical handle (not shown) adjacent to the handle 234 will provide tilting about a longitudinal axis in the same general manner and arrangement as is illustrated for the handle 234. Preferably both handles will have conventional locking pawl arrangements so as to retain the propellers at any desired tilt, as indicated by the trip 240 and tooth surface 242.

Thus, it will be apparent that by suitable operation of both handles a combination of tilting on two axes may be achieved so that the axis of rotation of propellers 30 and 32 may be set at any desired angle within design limits with respect to the fuselage.

It is contemplated that the tilt control handles will be so situated in the cockpit 28 that a pilot will be able to sit on a seat 244 with one handle on each side of him within easy grasp.

The pulley and cable control system is a conventional arrangement and is merely suggestive of one mode of controlling propeller tilt. It will be understood that various details of the cable system are omitted, the disclosure being primarily schematic and more or less similar to the schematic arrangement shown in Fig. 6 for a modified craft to be subsequently described.

Attention is now invited to the fore and aft airfoil elements 44 and 46. These elements have fairly large horizontal surfaces 44a and 46a respectively and vertical sides 44b and 46b respectively. Each element is housed in a respective compartment such as the compartments 250 and 252 as shown in Fig. 1, which compartments are formed in the construction of the fuselage. In order to provide for moving the elements 44 and 46 into and out of their respective compartments, a more or less conventional cable and pulley system is utilized. Thus, for the airfoil 44 a cable 256 is secured by a fastening 258 to one of the sides of element 44 and thence passes around a pulley 260 secured to element 44 and then around additional pulleys as shown and led to a drum 264 around which it is frictionally wrapped several times and finally back to the fastening 258 around suitably disposed pulleys. Thus the cable is continuous and it will be appreciated that rotation of drum 264 will result in sliding motion of element 44 either inwardly or outwardly of the fuselage, depending upon the direction of rotation of the drum and the extent of rotation. In order to manually rotate the drum 264, a worm gear 266 is secured thereto which is rotated by a worm and crank handle arrangement as designated by reference character 270. Preferably the drum and crank arrangement is disposed to the side of the fuselage as indicated in Fig. 2 so as to be readily accessible to the pilot as he occupies the center space in the cockpit. It will thus be apparent that he may rotate the crank arrangement with his left hand to rack the element 44 inwardly or outwardly to any desired degree, thereby effecting a downwardly tilting force on the craft by virtue of the downwash from the propellers impinging on the surface 44a.

In a similar manner a cable and drum arrangement for crank handle operation is provided for the rearward air foil 46, the drum being designated as 274 and the crank handle arrangement as 276. Since the pulley and cable system for element 46 follows the general scheme as heretofore described for element 44 it is not thought that any detailed explanation is necessary.

The same arrangement is carried out for racking the transverse airfoil surfaces 50 and 52 in and out of compartments suitably provided for them in the fuselage; a cable 52a (Fig. 2a) being utilized to operate airfoil 52 and be secured thereto by lug 52b, passing around suitably disposed pulleys as shown. The airfoils 50 and 52 may be mounted on rollers such as 52c. All essentials of the cable and pulley system as heretofore described for the fore and aft elements are the same and accordingly the details thereof need not be described except as is shown in Fig. 2 wherein the drum 280 and its respective crank handle control the airfoil 52 while the drum 282 and its respective crank handle control the airfoil 50. These drums and crank handles are located at the opposite side of the cockpit with respect to the drums 264 and 274 and are operated by the pilot's right hand.

In general, the specific pulley and cable systems are merely one suggested mode of operating the various fore and aft and lateral airfoil elements and being of a generally conventional nature as heretofore used in ships and aircraft as well as other devices, the invention is not limited thereby. For example, screws, levers, electric motors, solenoids, pneumatic and hydraulic cylinders, etc. are all useable for controlling the airfoil elements and the cable and pulley system is merely illustrative of one method. Further, the layout, arrangement and disposition and planes of rotation of the several pulleys is purely a matter of design to conform to the structure and size of any particular craft in which my invention is incorporated. It is again repeated that the arrangement shown is purely schematic and that the principles of pulley-cable and rotary-drum systems are well known and have long been used and are readily adaptable for applying mechanical force to any element of a device from any remote point. Accordingly, many of the details of the particular system shown on the drawing have been omitted because they lie purely within the realm of mechanical skill and have been well understood for many years.

From the foregoing description, it will be apparent that my invention contemplates the use of fore and aft airfoil elements and lateral airfoil elements which may be individually racked in and out of the downwash from the propellers to provide any degree of tilt of the craft in any desired direction. It will further be appreciated that the airfoil elements are not limited to the specific shapes shown but may be suitably designed to meet required conditions. For example, the airfoils 50 and 52 are suggested as being streamlined at their outer margins, as indicated on Fig. 2 and may also be shaped so as to be streamlined in the fore and aft direction. These elements may be considered for the present purposes of being hollow bodies constructed in accordance with the principles of conventional aircraft wings.

A further effect is thought to reside in the use of the several airfoils to the extent that they would provide a certain amount of lift depending upon the speed of the craft and the angle it may have to the oncoming wind.

Referring now to the form of the invention shown in Figs. 4, 5, and 6, an aircraft 300 is disclosed having two pair of forward propellers 302 and 304 and a pair of rear propellers 308. The forward propellers are substantially the same in construction, operation, and control as heretofore described for the propellers 30, 32, 38, and 40 of Fig. 1 and it is felt that no further detailed description need be given in view of the ease of recognition from Fig. 4 of such items as a rigidifying shaft 312, a tiltable plate 314, control cables 316, and respectively pulleys therefor, and control handles 320 in the cockpit 321, all such elements finding their counterparts in, respectively, shaft 82, plate 216, cables 230, pulleys 238, handles 234, in the form shown in Figs. 1–3.

As in the form shown in Fig. 1, the lower propellers 304 are tiltable by manual control while the upper propellers rotate about an axis which does not tilt with respect to the fuselage. The entire mechanism for supporting, rotating, and providing tilt is essentially the same as previously described for the prior modification, it being understood that the reference character 320 refers to two handles, which as shown on Fig. 6 control tilt for the plate 314. Through suitable cables a, b, c, d attached to the respective cross bars of the handles as shown and extending continuously to the respective continuations a', b', c', d', points in the vicinity of plate 314 and passing over a roller 324 which may be preferred for the purpose of substitution for a plurality of pulleys. It will be understood that the roller is comprised of a series of independently rotatable segments inasmuch as the cables move independently of each other. The intermediate lengths of the cables between the respective points a through d and a' through d' are, of course, disposed as determined by the configuration of the interior of the craft and will be understood to be provided with suitable pulleys at points where bends are necessary. Since such configuration of cables would vary from craft to craft, and since the layout would be purely a matter of particular conditions of the specific craft, amounting to no more than choice and design, it is not felt that it is necessary to show a specific detailed layout for any particular craft.

The rearward propellers 308 are similarly carried on a tiltable plate 330, which plate is controlled by the handles 332 through cables e through h connected respectively to their continuations at the points e' through h'. Here again suitable pulleys are provided as required. It should be noted that the cable and lever arrangement is preferably such as is indicated in Fig. 6 that all handles are to one side of the cockpit. Alternatively, the handle distribution in the cockpit, being a matter of choice, may be arranged so as to have two handles at one side and two handles at the other side.

Referring now to Fig. 5, the tilt arrangement for the propellers 308 is shown in detail and will be seen to comprise an arrangement basically similar to that for the propellers 30, 32, as disclosed on Fig. 3. In this instance, the floor 336 of the fuselage is provided with a standard 338 rigidly supporting a sphere 340 on a pintle 344. The sphere is bolted to the pintle to prevent axial movement therefrom as by the bolt and nut arrangement 346 and suitable bearing devices at the upper and lower end of the pintle 348 and 350 are provided so that the sphere can rotate with respect thereto, depending upon the amount of friction in the system.

Supported on the sphere 340, is a tapered and hollow hub 354 which is secured to the sphere by means of the collars 356, 358, and 360. Suitable bearing devices such as 362 and 364 are provided so that the hub 354 is freely rotatable with respect to the sphere. The collar 360 is bolted to the hub as by bolts 366 while the collar 356 is bolted to a bottom flange 370 of the hub as by bolts 372, there being a bevelled gear 376 sandwiched intermediate the flange and the collar, as shown. Collar 356 rests on the tilt plate 330 through the intermediary of suitable bearings such as the bearing device indicated by the conical rollers 380. A securing collar 382 bolted to plate 330 as by bolts 384 secures collar 356 in position through the intermediary bearing device as indicated by reference character 388. An additional bearing device as indicated by reference character 397 is disposed below the gear 376 and a surface of collar 382.

The propellers 308 are secured by split couplings to the hub 354. Thus, the upper propeller is held in assembly by coupling sections 390 and 392 which are bolted together as shown and likewise bolted to the hub by means of bolts such as 396 engaging section 392. It is understood that the upper propeller rotates with the hub inasmuch as it is securely fastened thereto by the construction described.

The lower propeller 308 is fastened in a similar manner to a split coupling comprising the sections 400 and 402 which, when assembled, are rotatably carried on the hub by means of the bearing devices 406 intermediate the internal periphery of the coupling and a tapered collar 408 resting on an outwardly tapered portion of the exterior of the hub. It will be understood that this mode of assembly may be effected by providing the collar 408 in three rings such as 408a, b, and c which are placed on the tapered portion 410 of the hub successively. A retainer collar 414 is bolted to the hub to retain the ring assembly 408 in place. A bearing device 416 is placed intermediate a flange 418 on the hub and an inwardly turned flange 420 on the lower half of the section 402. Flange 420 is formed with gear teeth 424 as shown.

Mounted on the tilt plate 330 are suitable motors 430 and 432 having pinions 434 and 436, respectively, which mesh with gears 424 and 376, respectively.

Thus it will be understood that the motors are operative to rotate the propellers 308, counter rotation being provided for in accordance with well-known principles.

Accordingly, the entire propeller and motor system is mounted on and carried by the plate 330 which is in turn mounted on and carried by the sphere 340. Tilt control of plate 330 is provided through the cable system 316, control being had in a manner heretofore described.

Attention is now invited to a preferred form of gear contemplated for use for the gears of my craft such as the gears 120, 122, 376, and 424.

In view of the speed with which such gears must turn, and in view of the forces exerted thereon, I prefer to reduce the frictional losses by providing a gear as is shown in Figs. 7, 8, and 9 in fragmentary form. wherein the teeth such as 500, are provided with a series of aligned sockets 502 in each of which is disclosed a roller 504. The rollers 504 are carried on a shaft 506 having threaded engagement at one end in a suitable bore 508 provided at the ends of each tooth. The opposite end of each shaft 506 is provided with a bolt head having a kerf 510 by which the shaft may be removed by means of a screw driver.

Thus, by providing a plurality of independently rotatable rollers the frictional affect of the teeth as they mesh with their respective pinions is considerably reduced.

Preferably the hub is left substantially open at the top although it may be partially closed by a plate 440. The purpose of this arrangement is to permit the passage of cooling air downwardly through the hub which can pass through ports such as the port 442 to the interior of the motor compartment. For the same purpose, the top 444 of the fuselage would have an opening 446 of sufficient diameter to accommodate tilting of the system to any designed degree as well as to provide suitable ventilation for the motors. If desired, the interior of the hub could be provided with vanes for the purpose of bringing air downwardly into the motor compartment or exhausting air therefrom.

Referring now to Fig. 10, a modification is shown for the rear propeller assembly of the form of the invention shown in Fig. 4, which differs principally from the construction previously described by virtue of a shaft 600 which extends through the hollow hubs that support the propellers. Thus, the shaft 600 forms a rigidifying element for the entire assembly.

In the structure shown in Fig. 10, the upper propeller 602 is provided with the usual split flanged coupling 606, which is fastened by a plate 608 and collar 610 to a hollow hub or shaft 614, as by bolts as shown. An end cap 616 and bearing assembly 618 is utilized in conjunction with a bearing assembly 620 retained by an inturned collar on plate 608 to provide frictionless rotation of hub 614 with respect to the shaft 600. At the lower end of hub 614 an additional bearing assembly 624 is provided to take the weight of the upper propeller and its hub and transmit it to the circular base 626 of shaft 600 which bears on a pair of concentric collars 628 and 630, having intermediate bearing assembly 632 to transmit the stress to a sphere 636. The shaft base 626 is provided with a flange 626a bolted as shown to a sleeve 638, the lower end of which rests on and is bolted to the tilt plate 640.

The tilt plate 640 bears the usual motors 644 and 646, the motor 644 transmitting torque through a pinion 648 and a gear 650 having a collar 652 bolted to a sleeve 654 which surrounds sleeve 638. Suitable bearing assemblies such as 660, 662, and 664 are provided intermediate the sleeve 638 and 654 to provide relative rotation therebetween. Thus, it will be seen that the motor 644 can rotate the sleeve 654 for the purpose of rotating shaft 614 and propeller 602 by virtue of threaded connection 668 between a flanged collar 670 at the lower end of shaft or hub 614 and the sleeve 654.

The lower propeller, 676, is provided with the usual split coupling 678 for attachment to a gear 680 wherein it will be seen that the formation of the coupling 678 is designed so as to have a bottom flange 682 which can bolt directly to the gear 680 as shown.

A bearing assembly 684 is disposed intermediate the upper end of the split coupling 678 and the collar 610 and a thrust bearing assembly 685 is disposed intermediate the flange of collar 670 and gear 680.

The gear 680 is rotated by a pinion 686 which is powered by the motor 646.

A suitable thrust bearing 688 is provided between the collar 654 and the tilt plate 640.

It will be noted that the shaft 600 is hollow for ventilation intake to the motor and it will be understood that suitable openings are provided in the various collars and sleeves, as a matter of design, to insure air flow to the motor compartment, all in a manner as heretofore taught in the previous construction.

The sleeve 638 may be designed with a spherical opening 690 on which the ball 636 rests, the configuration being such that the ball may be placed into the sleeve from the top of the sleeve, resting on a bearing assembly 692, retained on a thrust collar 694, which bears on the tilt plate 640 surrounding an opening 696.

The sphere 636 is fastened on a hub 698 carried on a pedestal 700, which is secured to the floor 702 of the craft in a manner which will be well understood by persons skilled in the art.

Tilt plate 640 is, of course, operable by cables precisely as hereinabove described in connection with the modification shown on Fig. 5.

Having thus described my invention, I wish it to be distinctly understood that the features and construction illustrated are subject to wide variations in design and accordingly I do not seek to be limited to the precise disclosure except as set forth in the appended claims.

I wish it further to be understood that another of the important features of novelty herein lies in the described non-rotating shafts supplying rigidity for the entire assembly and reducing vibration. These shafts are shown in Fig. 1 between the fixed shafts and the tiltable shafts, and in the embodiment shown by Fig. 10 within the tiltable shafts. As is well apparent, a rigid, non-rotating shaft may be provided separating each of the counter-rotating shafts, both tiltable and otherwise.

With respect to the motor arrangements described, whereby each counter-rotating shaft is powered by a separate motor, it is to be understood that the description of such operation is by way of illustration and not limitation, and that, within the scope of my invention, a pair of counter-rotating shafts may be powered by a single motor, the principles of such construction being too well known in the art to require further description.

I claim:

1. A helicopter comprising a plurality of pairs of counter rotating propellers, one of said pairs being rotative about an axis which is fixed with respect to a fuselage, the other of said pairs being rotative about the same axis, including means for angularly varying the axis of rotation of said other pair selectively with respect to the plane of rotation of the first pair of propellers.

2. A helicopter comprising a fuselage, a spherical bearing element carried thereby, a pair of concentric shafts passing through said spherical bearing element, counter rotating propellers carried at the outer ends of respective shafts, means for rotating said shafts in opposite directions, a collar surrounding said spherical element and tiltably carried thereby, a pair of counter rotating propellers carried by said collar, means for providing power to said latter propellers to effect rotation in opposite directions, and means for effecting tilting of said collar so as to vary the rotational planes of said latter propellers with respect to said fuselage.

3. A helicopter as set forth in claim 2, the shafts and collar being hollow and further provided with means for the introduction of air for cooling the motors and movable parts.

4. A helicopter comprising a fuselage, a pair of concentric counter-rotating shafts extending upwardly and outwardly from said fuselage, bearing elements intermediate said shafts, means supporting said shafts in permanently normal position with respect to said fuselage, propellers carried on said shafts and secured for rotation therewith, a pair of concentric counter-rotating sleeves surrounding said shafts and provided with intermediate bearing elements, propellers carried on said sleeves, a spherical element intermediate said sleeves and said shafts and on which said sleeves have bearing engagement so as to be tiltable with respect to said shafts, including means for tilting said sleeves so as to provide angularity of the plane of rotation of the propellers carried thereby with respect to the plane of rotation of said fuselage.

5. A helicopter as set forth in claim 4, including a non-rotative shaft disposed intermediate the rotating shafts and the rotating sleeves, and bearing elements provided between the non-rotative shaft and rotative shafts and sleeve.

6. A helicopter comprising a pair of counter-rotating fore propellers and a pair of counter-rotating aft propellers disposed for rotation normally in respective horizontal planes, means for selectively tilting the planes of rotation of said propellers to provide angularity to the planes of rotation of said propellers with respect to the normal horizontal planes of rotation, and an additional pair of counter-rotating propellers concentric with the axis of rotation of said fore propellers in normal horizontal planes, said latter additional pair of propellers being rotative about an axis fixed with respect to said fuselage.

7. An aircraft comprising a pair of propellers, a pair of concentric counter-rotating shafts for supporting said propellers, said counter-rotating shafts being fixed relative to a fuselage, a pair of concentric, counter-rotating collars surrounding said shafts and rotatively supported by the outer shaft, each of the collars supporting a propeller, and means for securing said collars so as to be tiltable with respect to the axis of rotation of the shafts.

8. A helicopter comprising a pair of propellers, a pair of concentric shafts for supporting and counter-rotating said propellers, an externally curved element through which said shafts pass, said element being fixed relative to a fuselage, a pair of concentric collars surrounding said element and supported thereby, said collars being adapted for rotation counter each other, a propeller carried by each of the collars and extending transversely therefrom, and means for tilting said collars with respect to the curved element so as to change the plane of rotation of the second pair of propellers with respect to the plane of rotation of said first pair of propellers.

9. A helicopter comprising in combination with a pair of fixed and concentric counter-rotative shafts, each supporting and rotating a propeller, a second pair of propellers, means for rotatively supporting said propellers comprising a pair of collar-like elements substantially concentric with the rotative axes of said propellers, means for supporting said collar-like elements for tilting thereof at selective angles with respect to a fuselage and to the fixed shafts, said means comprising a spherically shaped element within said collar-like elements, and means within said collar-like elements to provide support engagement thereof on said spherically shaped element.

10. A helicopter as set forth in claim 9, wherein said last named means is disposed at a point above the spherical center of said spherically shaped element, and additional means below said spherical center for providing bearing engagement between said collar-like elements and said spherical shaped element to transmit lift force thereto.

11. A helicopter comprising a fuselage, a pair of concentric counter-rotary shafts extending upwardly and outwardly from said fuselage in permanently normal position with respect thereto, a propeller carried on each of said shafts and secured for rotation therewith, a pair of concentric counter-rotating sleeves surrounding said shafts, a spherical element intermediate said sleeves and said shafts and on which said sleeves have bearing engagement so as to be tiltable with respect to said shafts, including means for tilting said sleeves simultaneously so as to provide angularity of the plane of rotation of the propellers carried thereby with respect to the plane of the rotation of the propellers carried by the shafts.

12. A helicopter comprising in combination with a fuselage and a pair of concentric counter-rotating shafts secured to said fuselage and extending upwardly and outwardly therefrom in a permanently normal position with respect thereto, and a propeller carried on each of said shafts, a spherical bearing element supported on said fuselage, a pair of concentric counter-rotating collars surrounding said bearing element, bearing means between said collars, a propeller supported on each collar, said collars being tiltable on said bearing element with respect to said fuselage so as to vary the plane of rotation of said propellers, a support plate carried by said collars, engine means carried by said support plate with means for transmitting power from said engine means to said propellers, and means for tilting said support plate so as to tilt said collars with respect to the fuselage.

13. A helicopter comprising a fuselage, a pair of concentric counter-rotating shafts fixed relative to the fuselage, a pair of concentric counter-rotating collars surrounding said shafts, the collars being adapted each to support and supporting a propeller, means for securing said collars so as to be tiltable with respect to the axis of rotation of the shafts, and control surfaces comprising airfoil elements selectively extensible from the fuselage into the region of the wash from the tiltable propellers so as to effect a maneuvering force on said aircraft by virtue of the impingement of the wash from said propellers on said control surfaces.

14. A helicopter as set forth in claim 13, including means for selectively tilting the axis of rotation of the tiltable propellers so as to vary the angle of downwash relative to said control surfaces.

15. A helicopter as set forth in claim 13, the control surfaces comprising airfoil elements housed within the fuselage and extensible therefrom at a plane parallel to the floor of the fuselage, and means to selectively extend the airfoil elements any given distance and to retract the same.

16. A helicopter as set forth in claim 13, the control surfaces comprising fore, aft and lateral airfoil elements housed within the fuselage and extensible therefrom at a plane parallel to the floor of the fuselage, and means to selectively extend the airfoil elements any given distance out of the fuselage and to retract the same.

References Cited in the file of this patent

UNITED STATES PATENTS

| | | |
|---|---|---|
| 29,634 | Street | Aug. 14, 1860 |
| 1,500,807 | Flanigan | July 8, 1924 |
| 2,274,051 | Larsen | Feb. 17, 1942 |
| 2,273,303 | Waldron | Feb. 17, 1942 |
| 2,414,435 | Bendix | Jan. 21, 1947 |
| 2,450,491 | Solovioff et al. | Oct. 5, 1948 |
| 2,581,369 | Erickson | Jan. 8, 1952 |
| 2,630,984 | Ballauer | Mar. 10, 1953 |